(12) United States Patent
Damnjanovic et al.

(10) Patent No.: US 11,510,065 B2
(45) Date of Patent: Nov. 22, 2022

(54) AUTOMATIC FREQUENCY COORDINATION (AFC) FOR UNLICENSED SPECTRUM

(71) Applicant: QUALCOMM Incorporated, San Diego, CA (US)

(72) Inventors: Aleksandar Damnjanovic, Del Mar, CA (US); Yongbin Wei, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 108 days.

(21) Appl. No.: 16/748,227

(22) Filed: Jan. 21, 2020

(65) Prior Publication Data
US 2020/0236558 A1 Jul. 23, 2020

Related U.S. Application Data

(60) Provisional application No. 62/795,197, filed on Jan. 22, 2019.

(51) Int. Cl.
H04W 16/14 (2009.01)
H04W 74/04 (2009.01)
H04W 84/12 (2009.01)

(52) U.S. Cl.
CPC ........... *H04W 16/14* (2013.01); *H04W 74/04* (2013.01); *H04W 84/12* (2013.01)

(58) Field of Classification Search
CPC ..... H04W 16/14; H04W 74/04; H04W 84/12; H04W 74/006
See application file for complete search history.

(56) References Cited

U.S. PATENT DOCUMENTS 9,826,532 B1* 11/2017 Chu .................. H04W 72/1284
2008/0117810 A1* 5/2008 Stott ....................... H04L 12/66
370/230

(Continued)

FOREIGN PATENT DOCUMENTS

WO 2017070055 A1 4/2017
WO 2018118222 A1 6/2018

OTHER PUBLICATIONS

Ericsson: "TP to TR 37.890—US Updates", 3GPP Draft, 3GPP TSG-RAN Meeting #82, RP-182309_TP TO TR 37.890 US Updates, 3rd Generation Partnership Project (3GPP), Mobile Competence Centre, 650, Route Des Lucioles, F-06921 Sophia-Antipolis Cedex, France, vol. TSG RAN, No. Sorrento, Italia, Dec. 10, 2018-Dec. 13, 2018, Dec. 9, 2018 (Dec. 9, 2018), XP051552486, 4 Pages, Retrieved from the Internet: URL: http://www.3gpp.org/ftp/Meetings%5F3GPP%5FSYNC/RAN/Docs/RP%2D182309%2Ezip, [retrieved on Dec. 9, 2018], figure 4.2.1.1, tables 4.2.1.3 . 1-14.2.1.1-2, p. 5, paragraph 4.2 .1.2—p. 7, paragraph 4.2 .1.3.

(Continued)

Primary Examiner — Mohammad S Anwar
(74) Attorney, Agent, or Firm — Liem T. Do

(57) ABSTRACT

Wireless communications systems and methods related to automatic frequency coordination (AFC) for spectrum sharing among multiple network operating entities are provided. A first wireless communication device transmits, to a spectrum access coordination entity, a spectrum access request. The first wireless communication device receives, from the spectrum access coordination entity in response to the spectrum access request, a configuration including at least a medium access protocol parameter for performing a medium access procedure in a spectrum shared by a plurality of network operating entities.

30 Claims, 8 Drawing Sheets

(56) References Cited

U.S. PATENT DOCUMENTS

| | | | | |
|---|---|---|---|---|
| 2008/0130570 | A1* | 6/2008 | Jung | H04W 28/18 |
| | | | | 370/330 |
| 2012/0002644 | A1* | 1/2012 | Fettweis | H04W 72/048 |
| | | | | 370/336 |
| 2013/0188510 | A1* | 7/2013 | Siomina | H04W 24/10 |
| | | | | 370/252 |
| 2013/0203429 | A1* | 8/2013 | Kneckt | H04W 74/0816 |
| | | | | 455/450 |
| 2014/0066086 | A1* | 3/2014 | Jo | H04L 27/0006 |
| | | | | 455/454 |
| 2014/0237547 | A1* | 8/2014 | Bose | H04W 72/082 |
| | | | | 726/3 |
| 2015/0223077 | A1* | 8/2015 | Fan | H04W 16/14 |
| | | | | 370/312 |
| 2016/0212625 | A1 | 7/2016 | Damnjanovic et al. | |
| 2016/0353485 | A1* | 12/2016 | Wentink | H04W 72/14 |

OTHER PUBLICATIONS

International Search Report and Written Opinion—PCT/US2020/014618—ISA/EPO—dated Apr. 21, 2020.
Ericsson: "TP to TR 37.890-US Updates", 3GPP Draft, 3GPP TSG-RAN Meeting #82, RP-182309_TP TO TR 37.890 US Updates, 3rd Generation Partnership Project (3GPP), Mobile Competence Centre, 650, Routes Des Lucioles, F-06921 Sophia-Antipolis Cedex, France, vol. TSG RAN, No. Sorrento, Italia, Dec. 10, 2018-Dec. 13, 2018, Dec. 9, 2018 (Dec. 9, 2018), XP051552486, 4 Pages, Retrieved from the Internet: URL: http://www.3gpp.org/ftp/Meetings%F3GPP%6FSYNCR/RAN/Docs/RP%D182309%Ezip, [retrieved on Dec. 9, 2018], figure 4.2.1.1, tables 4.2.1.3. 1-14.2.1.1-2, p. 5, paragraph 4.2 1.2—p. 7, paragraph 4.2 .1.3.

* cited by examiner

AUTOMATIC FREQUENCY COORDINATION (AFC) FOR UNLICENSED SPECTRUM

CROSS REFERENCE TO RELATED APPLICATIONS

The present application claims priority to and the benefit of U.S. Provisional Patent Application No. 62/795,197, filed Jan. 22, 2019, which is hereby incorporated by reference in its entirety as if fully set forth below and for all applicable purposes.

TECHNICAL FIELD

This application relates to wireless communication systems, and more particularly to automatic frequency coordination (AFC) for spectrum sharing among multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Recently, federal communications commission (FCC) had proposed to allow Institute of Electrical and Electronics Engineers (IEEE) 802.11 (WiFi) devices and unlicensed devices of other technical standards, such as new radio-unlicensed (NR-U), to operate in the 6 gigahertz (GHz) frequency band for wireless communications. However, there are various existing licensed incumbents, such as fixed services (FSs) and fixed satellite services (FSSs) in the 6 GHz band. The licensed incumbents may occupy a certain portion of the 6 GHz band during certain time periods. Thus, the unlicensed devices may opportunistically access the frequency band when the frequency band is available. In some examples, the licensed incumbents may operate as primary users and other unlicensed devices may operate as secondary users for sharing the frequency band. To protect the licensed incumbents, several industry groups had proposed to utilize automatic frequency coordination (AFC) to ensure that the unlicensed devices sharing the frequency band may not interfere with primary licensed incumbents.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising transmitting, by a first wireless communication device to a spectrum access coordination entity, a spectrum access request; and receiving, by the first wireless communication device from the spectrum access coordination entity in response to the spectrum access request, a configuration including at least a medium access protocol parameter for performing a medium access procedure in a spectrum shared by a plurality of network operating entities.

In an additional aspect of the disclosure, a method of wireless communication, comprising receiving, by a spectrum access coordination entity from a wireless communication device, a spectrum access request; and transmitting, by the spectrum access coordination entity to the wireless communication device in response to the spectrum access request, a configuration including at least a medium access protocol parameter for performing a medium access procedure in a spectrum shared by a plurality of network operating entities.

In an additional aspect of the disclosure, an apparatus comprising a transceiver configured to transmit, to a spectrum access coordination entity, a spectrum access request; and receive, from the spectrum access coordination entity in response to the spectrum access request, a configuration including at least a medium access protocol parameter for performing a medium access procedure in a spectrum shared by a plurality of network operating entities.

In an additional aspect of the disclosure, an apparatus comprising a transceiver configured to receive, from a wireless communication device, a spectrum access request; and transmit, to the wireless communication device in response to the spectrum access request, a configuration including at least a medium access protocol parameter for performing a medium access procedure in a spectrum shared by a plurality of network operating entities.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
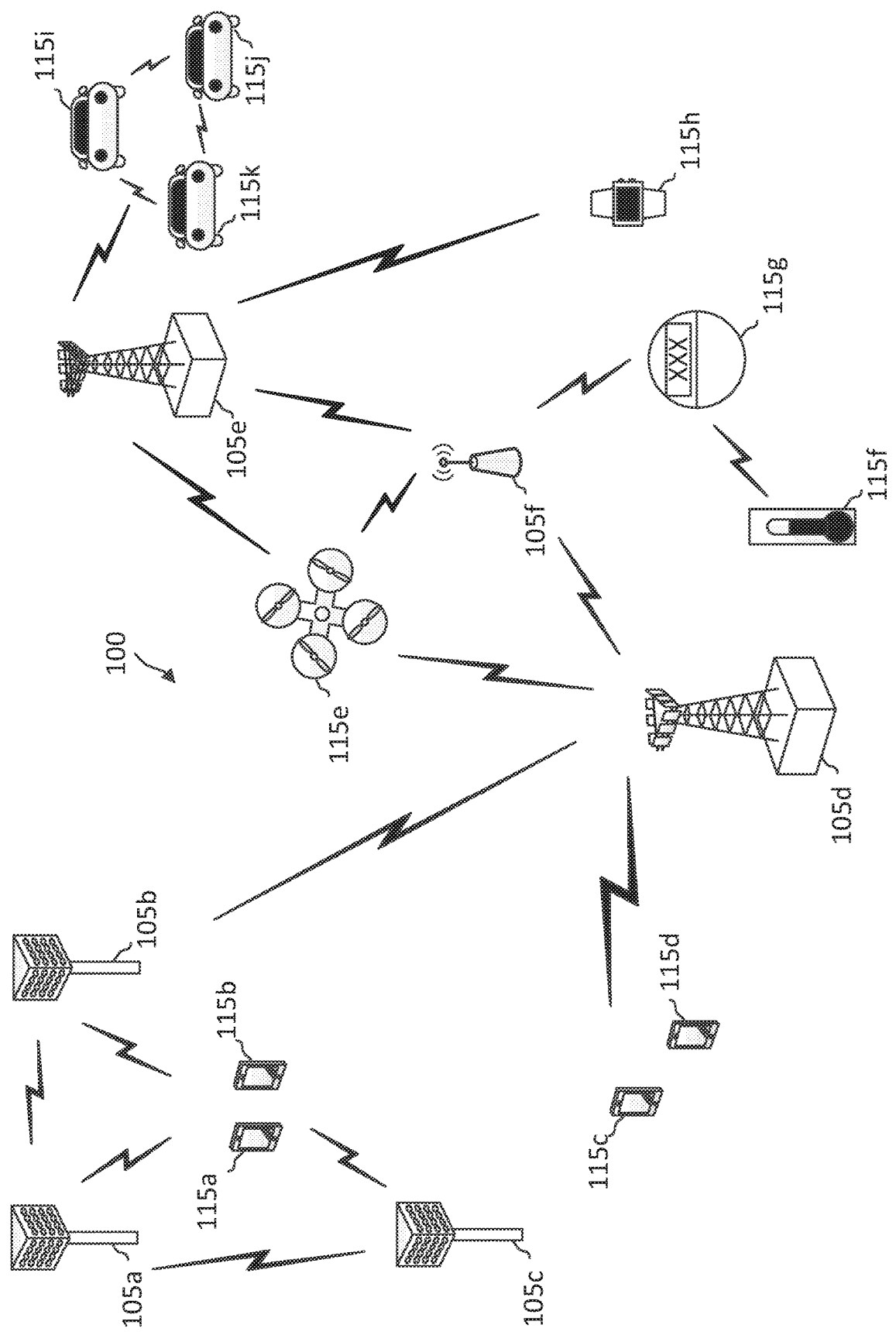
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 404.11, IEEE 404.16, IEEE 404.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for automatic frequency coordination (AFC) in a spectrum (e.g., a shared spectrum or an unlicensed spectrum) shared by multiple network operating entities. The spectrum may include licensed incumbents that are to be protected from interference. In the disclosed embodiments, an AFC entity includes one or more AFC operators and one or more AFC registrars configured to perform AFC in the spectrum. The AFC operators and registrars are accredited by certain industry bodies (e.g., 3GPP and WiFi Alliance (WFA)). A wireless communication device may request access to the spectrum from one of the AFC operators. The wireless communication device may include, in the request, geographical location information of the wireless communication device. In some examples, the wireless communication device is a base station (BS). In some other examples, the wireless communication device is a user equipment (UE). The AFC operator may query one or more of the AFC registrars for access configuration information. The query may be based on the geographical location information of the wireless communication device. The access configuration information may include frequency bands or subbands that are available for use by unlicensed devices, medium access configuration parameters, communication protocol versioning parameters, and/or radio access technology (RAT) configuration parameters. The AFC operator may respond to the request from the wireless communication device by transmitting a spectrum access grant. The spectrum access grant may include access parameters based on the access configuration information received from the query. Upon receiving the spectrum access grant, the wireless communication device may perform medium access based on the received access parameters.

For medium access controls, the spectrum access grant may include medium access configuration parameters associated with reservation signal waveforms (e.g., preamble or waveform sequences), reservation signal detection mechanisms (e.g., energy detection or signal detection), listen-before-talk (LBT) modes ((e.g., category 1 (CAT1) LBT, category 2 (CAT2) LBT, category 3 (CAT3) LBT, and/or category 4 (CAT4) LBT), medium contention mechanisms (e.g., synchronous or asynchronous), and/or allowable TXOP durations. For protocol version controls, the spectrum access grant may indicate that devices implementing certain wireless communication protocol versions are allowed to access certain frequency bands, for example, by distributing devices supporting different versions to different bands. For technology controls, the spectrum access grant may indicate that devices of certain RATs are allowed to access certain frequency bands, for example, by distributing devices of different RATs to different bands.

Aspects of the present application can provide several benefits. For example, the use of an AFC entity to control the medium access procedure or protocol configuration parameters can allow for more uniform medium access or LBT mechanisms in the spectrum. The use of an AFC entity to control devices that are allowed to access the spectrum or certain subbands based on communication protocol versions can ensure compatibility among devices accessing the same band. The use of an AFC entity to control devices that are allowed to the access the spectrum or certain subbands based on RATs can provide coexistence and/or load balancing among different technologies. Accordingly, the disclosed embodiments may provide more than incumbent protection by avoiding interference to incumbent services. The disclosed embodiments may improve medium access performance and/or spectrum utilization efficiency.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In an FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform LBTs in the shared channel. Upon an LBT pass, the BS 105 may reserve a TXOP in the shared channel and schedule a UE 115 for communications over the shared channel. Upon an LBT failure, the BS 105 may refrain from accessing the shared channel. The BS 105 may perform different types of LBTs, which may include CAT1 LBT, CAT2 LBT, CAT3 LBT, and/or CAT4 LBT. CAT1 LBT refers to no LBT is required prior to a transmission. CAT2 LBT is referred to as a one-shot LBT without random backoff. CAT3 LBT includes random backoff. CAT4 LBT includes random backoff and a variable contention window. The BS 105 may select an LBT mode based on various factors, such as a transmission duration and/or the time elapsed since a last CAT4 LBT. In some examples, the UE 115 may also perform an LBT prior to transmitting to the BS 105.

In an embodiment, the network 100 may operate over a 6 GHz frequency band, which may include licensed incumbents. The licensed incumbents may operate as primary users and the BSs 105 may communicate with the UEs 115 operating as secondary users for sharing the frequency band. In an embodiment, the sharing of the frequency band may be controlled by an AFC entity (not shown). The AFC entity may maintain a list of available frequencies and/or frequency bands that are not occupied by a licensed incumbent at each geographical location. A BS 105 desiring to access the frequency band may determine a geographical location of BS 105 and consult with the AFC entity regarding available frequencies and/or frequency bands in the area of operation. The BS 105 may select a frequency band for communications with a UE 115 based on the consultation with the AFC entity. According to embodiments of the present disclosure, in addition to maintaining available frequencies and/or controlling frequency band access, the AFC entity may control medium access procedures, communication protocols, and/or RATs used by the unlicensed devices (e.g., the BSs 105 and/or the UEs 115) in accessing the frequency band. Mechanisms for AFC with medium access controls, communication protocols controls, and/or RAT controls among different network operating entities are described in greater detail herein.

Figure 2:
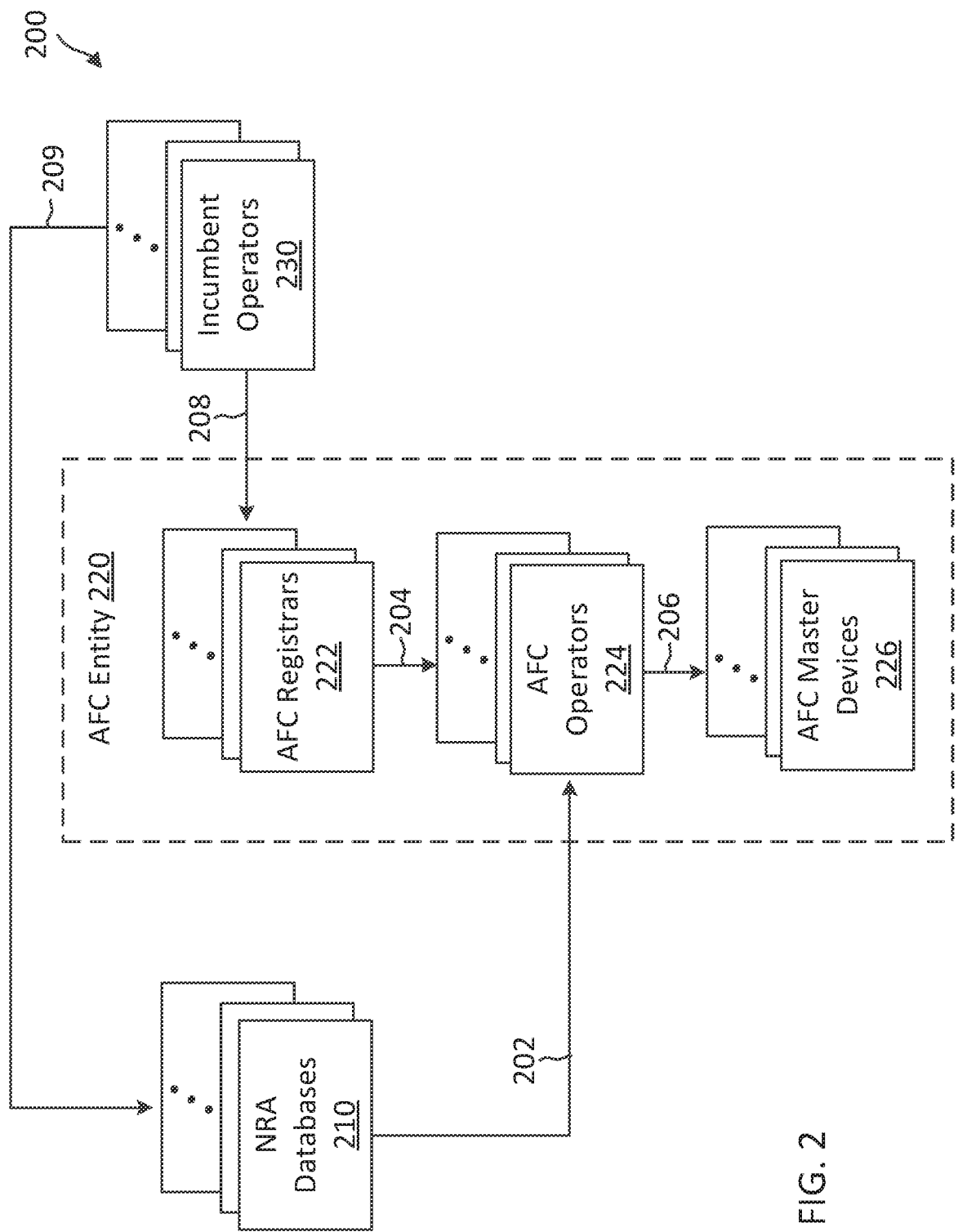
FIG. 2 illustrates a high-level automatic frequency coordination (AFC) functional architecture according to some embodiments of the present disclosure.

FIG. 2 illustrates a high-level AFC architecture 200 according to some embodiments of the present disclosure. The AFC architecture 200 may be employed by the network 100 for sharing a frequency band, for example, a 6 GHz band. The AFC architecture 200 includes a plurality of national regulatory authority (NRA) databases 210, an AFC entity 220, and a plurality of incumbent operators 230. The incumbent operators 230 are licensed holders with one or more protected receivers (e.g., FS receivers and/or FSS receivers) in a regulatory domain.

The NRA databases 210 are electronic databases controlled and maintained by national regulators. Examples of national regulators may include United States (US) FCC, United Kingdom (UK) office of communications (Ofcom), and France agency national frequency (ANFR). The NRA databases 210 may include licensing data associated with the incumbent operators 230. The NRA databases 210 may include parameters associated with protected services of the incumbent operators 230. The parameters may include frequencies used by the incumbent operators 230 and/or geographical locations of the incumbent operators 230. The incumbent operators 230 may register with the NRA databases 210 according to NRA licensing procedures as shown by the arrow 209.

The AFC entity 220 includes one or more AFC registrars 222, one or more AFC operators 224, and one or more AFC master devices 226. The AFC operators 224 include software, servers, network units, and/or network systems configured to perform AFC functions that are in compliance with an AFC regulatory body (e.g., including 3GPP standard body and/or Wi-Fi Alliance (WFA)) and certified by NRA. The AFC operators 224 may include radio local area network (RLAN) equipment manufacturers, mobile device manufacturers, and/or spectrum database operators.

The AFC registrars 222 include electronic databases of the approved and certified AFC operators 224. The AFC registrars 222 may include AFC identifiers and/or point of contact information associated with the AFC operators 224. The AFC registrars 222 may maintain and track interference reports received from the incumbent operators 230 (e.g., via web forms) as shown by the arrows 208. In some examples, the AFC entity may include contour modification databases that maintain and track protection contours associated with each individual site of the incumbent operators 230. The AFC registrars 222 may perform temporary and/or permanent protection contour modifications for the individual incumbent sites and/or synchronize AFC identifiers and/or modifications with the contour modification databases. The AFC registrars 222 may maintain and track frequency bands that are available for use by unlicensed devices. In some examples, there may be about 2-3 AFC registrars 222 worldwide.

The AFC master devices 226 include access points (APs) and/or BSs similar to the BSs 105. The AFC master devices 226 may implement a certain protocol for communicating with a server of an AFC operator 224. The AFC master devices 226 may establish a wireless network connection to serve a client device such as stations (STAs) and the UEs 115. Each AFC master device 226 may have knowledge of its own geographical location information.

The AFC operators 224 may be in communication with the AFC registrars 222, the NRA databases 210, and the AFC master devices 226. In an example, the AFC operators 224 may query one or more of the NRA databases 210 to obtain licensing information, geographical location information, and/or frequency information associated with the incumbent operators 230 via an AFC-NRA protocol as shown by the arrow 202. In an example, the AFC operators 224 may query one or more of the AFC registrars 222 for AFC information, such as available frequency bands, via an AFC-registrar protocol as shown by the arrow 204. In an example, AFC operators 224 may communicate with the AFC master devices 226 via an AFC-master protocol as shown by the arrow 206. An AFC master device 226 may request spectrum access from an AFC operator 224. The AFC master device 226 may indicate to the AFC operator 224 a geographical location of the AFC master device 226. The AFC operator 224 may grant spectrum access to a requesting AFC master device 226 based on the geographical location of the AFC master device 226 and/or AFC information retrieved from one or more of the AFC registrars 222. The AFC operators 224 may indicate to the requesting AFC master device 226 which part of the frequency band is free to use.

According to embodiments of the present disclosure, in addition to protecting incumbent services, the AFC operators 224 may query one or more of the AFC registrars 222 regarding medium access information and/or supported protocol and/or RAT information for use among various network operating entities (e.g., 3GPP operators and/or WFA operators) in accessing the frequency band. Thus, the AFC operators can be utilized to control medium access procedures and/or communication protocol versions that are allowed in certain standards and/or load balancing and/or coexistence among different technologies. AFC operators and/or AFC registrars are to be accredited by certain wireless communication industry standards (e.g., 3GPP and WFA). AFC operators among different standards and/or technologies may coordinate and agree with each other in determining medium access parameters, protocol version parameters, and/or RAT parameters in sharing a spectrum.

Figure 3:
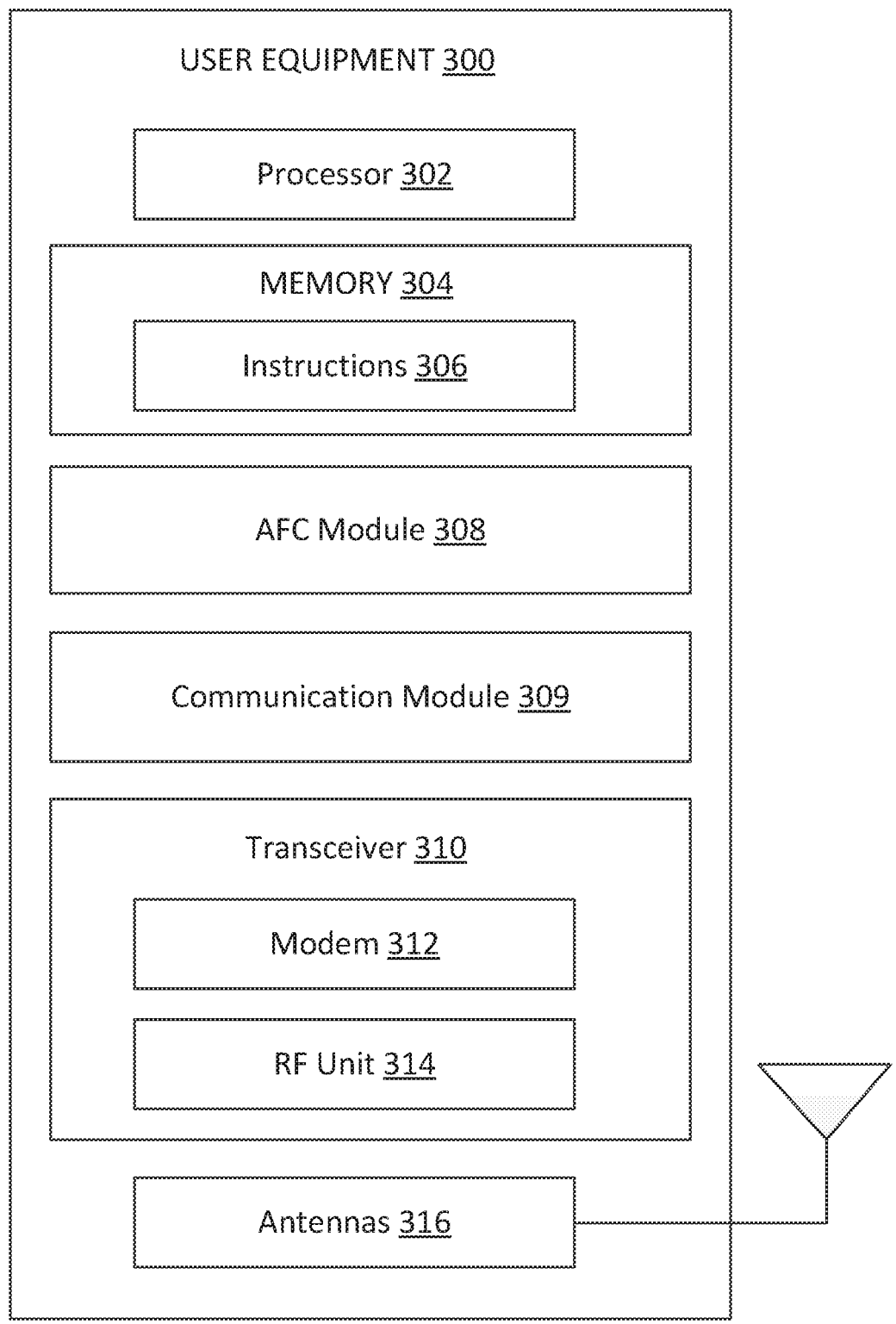
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, an AFC module 308, a communication module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 1-2 and 6-7. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the AFC module 308 and the communication module 309 may be implemented via hardware, software, or combinations thereof. For example, each of the AFC module 308 and the communication module 309 may be implemented as a processor, circuit, and/or instructions 306 stored in the memory 304 and executed by the processor 302. In some examples, the AFC module 308 and/or the communication module 309 can be integrated within the modem subsystem 312. For example, the AFC module 308 and/or the communication module 309 can be implemented by a combination of software components (e.g., executed by a DSP or a general processor) and hardware components (e.g., logic gates and circuitry) within the modem subsystem 312. In some examples, a UE may include the AFC module 308 or the communication module 309. In other examples, a UE may include AFC module 308 and the communication module 309.

The AFC module 308 and the communication module 309 may be used for various aspects of the present disclosure, for example, aspects of FIGS. 1-2 and 6-7. For example, the AFC module 308 is configured to request access to a spectrum from an AFC operator (e.g., the AFC operators 224) and receive a spectrum access grant from the AFC operator. The spectrum access grant may include medium access procedure or protocol information, such as a reservation signal waveform type, a reservation detection mode (e.g., energy detection or signal detection), a medium contention mode (e.g., synchronous or asynchronous), and/or an LBT mode (e.g., CAT2 LBT and/or CAT4 LBT). The spectrum access grant may indicate a version of a communication standard, specification, or protocol that is allowed to access a particular subband of the spectrum. The spectrum access grant may indicate a technology (e.g., 3GPP or WiFi) that is allowed to access a particular subband of the spectrum. The AFC module 308 is configured to perform medium access or LBT based on the configuration provided by the spectrum access grant. In some examples, the spectrum access request may include geographical location information of the UE 300 and the spectrum access grant may include medium access, protocol versioning, and/or RAT configuration information for the particular location of the UE 300. Mechanisms for performing AFC are described in greater detail herein.

The communication module 309 is configured to perform frequency scan over a list of available frequencies, for example, obtained from an AFC operator via the AFC module 308. The communication module 309 is configured to initiate communications with a BS (e.g., the BSs 105) in the spectrum by upon a successful LBT. The communication module 309 is configured to receive scheduling grants from the BS and communicate UL data, UL control information, DL data, and/or DL control information with the BS based on the scheduling grants.

In some other embodiments, the UE 300 may not include the AFC module 308 and may not communicate with an AFC operator directly. Instead, the UE 300 may rely on a serving BS to obtain a spectrum access grant from an AFC operator and communicate with the serving BS based on schedules granted by the BS.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, the AFC module 308, and/or the communication module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
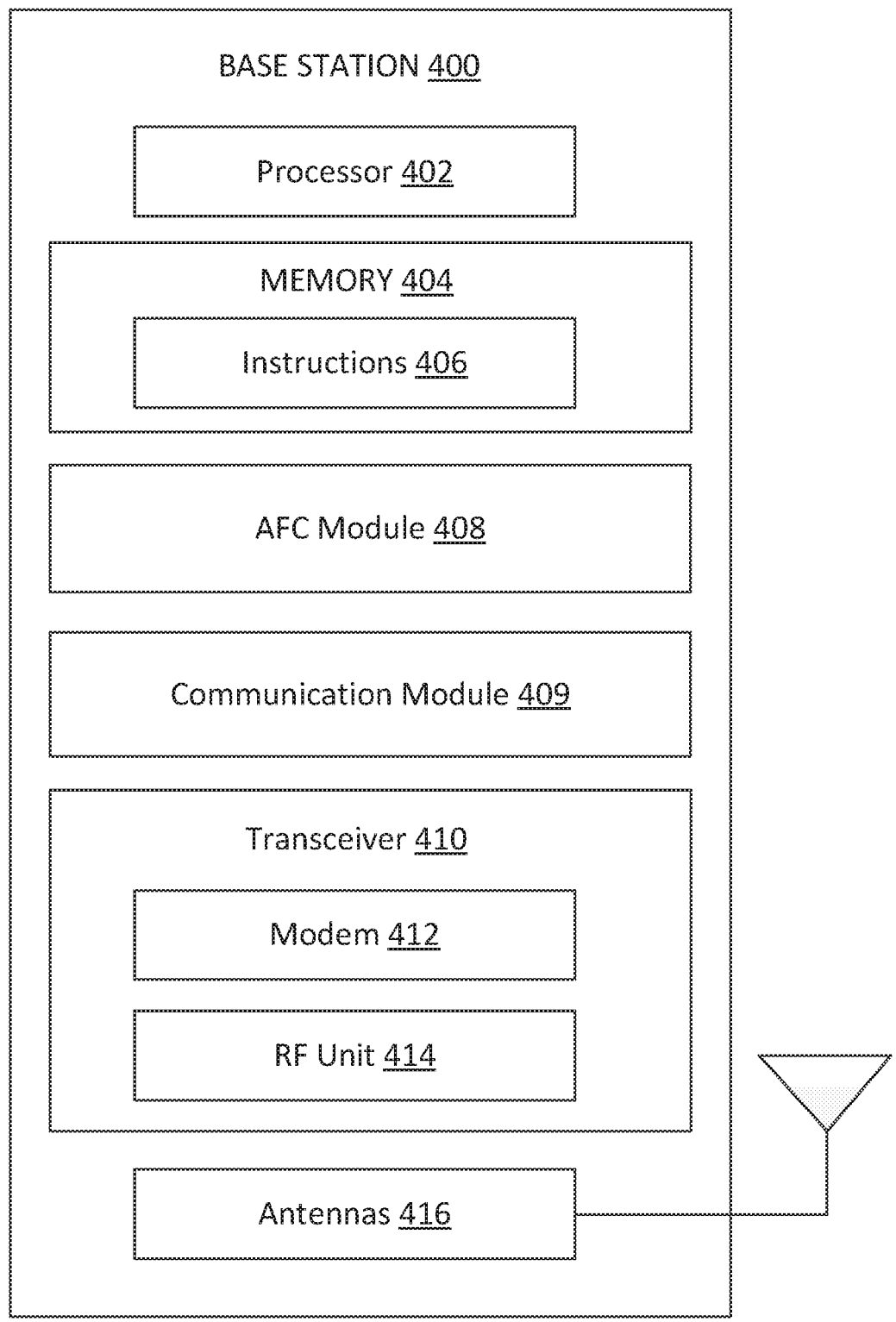
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 in the network 100 as discussed above in FIG. 1. As shown, the BS 400 may include a processor 402, a memory 404, an AFC module 408, a communication module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1-2 and 6-8. Instructions 406 may also be referred to as code, which may be interpreted broadly to include any type of computer-readable statement(s) as discussed above with respect to FIG. 3.

Each of the AFC module 408 and the communication module 409 may be implemented via hardware, software, or combinations thereof. For example, each of the AFC module 408 and the communication module 409 may be implemented as a processor, circuit, and/or instructions 406 stored in the memory 404 and executed by the processor 402. In some examples, the AFC module 408 and/or the communication module 409 can be integrated within the modem subsystem 412. For example, the AFC module 408 and/or the communication module 409 can be implemented by a combination of software components (e.g., executed by a DSP or a general processor) and hardware components (e.g., logic gates and circuitry) within the modem subsystem 412. In some examples, a BS may include the AFC module 408 or the communication module 409. In other examples, a BS may include the AFC module 408 and the communication module 409.

The AFC module 408 and the communication module 409 may be used for various aspects of the present disclosure, for example, aspects of FIGS. 1-2 and 6-8. For example, the AFC module 408 is configured to request access to a spectrum from an AFC operator (e.g., the AFC operators 224) and receive a spectrum access grant from the AFC operator. The spectrum access grant may include medium access procedure or protocol information, such as a reservation signal waveform type, a reservation detection mode (e.g., energy detection or signal detection), a medium contention mode (e.g., synchronous or asynchronous), and/or an LBT mode (e.g., CAT2 LBT and/or CAT4 LBT). The spectrum access grant may indicate a version of a communication standard, specification, or protocol that is allowed to access a particular subband of the spectrum. The spectrum access grant may indicate a technology (e.g., 3GPP or WiFi) that is allowed to access a particular subband of the spectrum. The AFC module 408 is configured to perform medium access or LBT based on the configuration provided by the spectrum access grant. In some examples, the spectrum access request may include geographical location information of the BS 400 and the spectrum access grant may include medium access, protocol versioning, and/or RAT configuration information for the particular location of the BS 400. Mechanisms for performing AFC are described in greater detail herein.

The communication module 409 is configured to schedule UL and/or DL communications with a UE (e.g., the UEs 115 and 300) upon a successfully LBT, transmit UL and/or DL scheduling grants to the UE, and/or communicate with the UE according to the scheduling grants.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
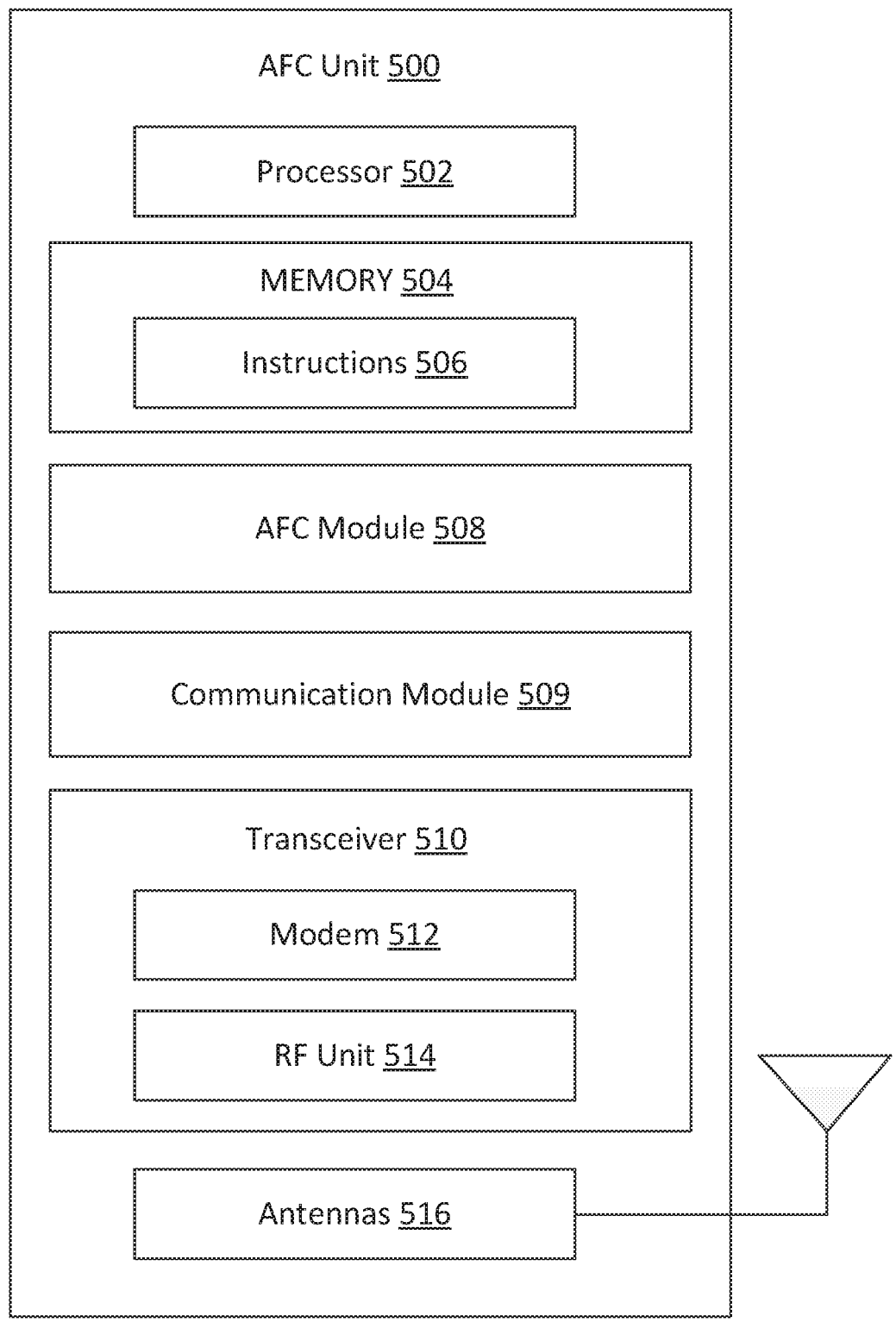
FIG. 5 is a block diagram of an exemplary AFC unit according to some embodiments of the present disclosure.

FIG. 5 is a block diagram of an exemplary AFC unit according to embodiments of the present disclosure. The AFC unit 500 may be an AFC operator 224 or an AFC registrar 222 in the network 200 as discussed above in FIG. 2. As shown, the AFC unit 500 may include a processor 502, a memory 504, an AFC module 508, a communication module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-2, 6, and 8. Instructions 506 may also be referred to as code, which may be interpreted broadly to include any type of computer-readable statement(s) as discussed above with respect to FIG. 3.

Each of the AFC module 508 and the communication module 509 may be implemented via hardware, software, or combinations thereof. For example, each of the AFC module 508 and the communication module 509 may be implemented as a processor, circuit, and/or instructions 506 stored in the memory 504 and executed by the processor 502. In some examples, the AFC module 508 and/or the communication module 509 can be integrated within the modem subsystem 512. For example, the AFC module 508 and/or the communication module 509 can be implemented by a combination of software components (e.g., executed by a DSP or a general processor) and hardware components (e.g., logic gates and circuitry) within the modem subsystem 512.

The AFC module 508 and the communication module 509 may be used for various aspects of the present disclosure, for example, aspects of FIGS. 1-2, 6, and 8. For example, the AFC module 508 is configured to receive a request from an AFC master device (e.g., the BSs 105 and 500 and the AFC master devices 226) and/or a client device (e.g., the UEs 115 and 300) requesting to access a spectrum, query one or more AFC registrars (e.g., the AFC registrars 222) for configuration information related to accessing the spectrum, and transmit a spectrum access grant to the requesting device based on the configuration information. The spectrum access grant may include medium access procedure or protocol information, such as a reservation signal waveform, reservation detection mode (e.g., energy detection or signal detection), a medium contention mode (e.g., synchronous or asynchronous). The spectrum access grant may indicate a version of a communication standard or protocol that is allowed to access a particular subband of the spectrum. The spectrum access grant may indicate a technology (e.g., 3GPP and/or WiFi) that is allowed to access a particular subband of the spectrum. In some examples, the spectrum access request may include geographical location information of the requesting device and the spectrum access grant may include medium access, protocol versioning, and/or RAT configuration information for the particular location of the requesting device.

In some embodiments, the AFC unit 500 corresponds to an AFC operator (e.g., the AFC operators 224). In such embodiments, the AFC module 508 is configured to transmit access configuration queries to one or more AFC registrars (e.g., the AFC registrars 222) and receive configuration information from the AFC registrars. In some embodiments, the AFC unit 500 corresponds to an AFC registrar. In such embodiments, the AFC module 508 is configured to receive access configuration queries from an AFC operator and respond to the queries by transmitting configuration information to the AFC registrars. In some examples, when the AFC unit 500 is associated with 3GPP, the AFC module 508 is configured to query 3GPP AFC registrars and/or WFA registrars. In some examples, when the AFC unit 500 is associated with WFA, the AFC module 508 is configured to query 3GPP AFC registrars and/or WFA registrars. Mechanisms for performing AFC are described in greater detail herein.

The communication module 509 is configured to communicate with AFC registrars, NRA registrars, AFC operators, AFC master devices and/or client devices.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 300. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 300 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
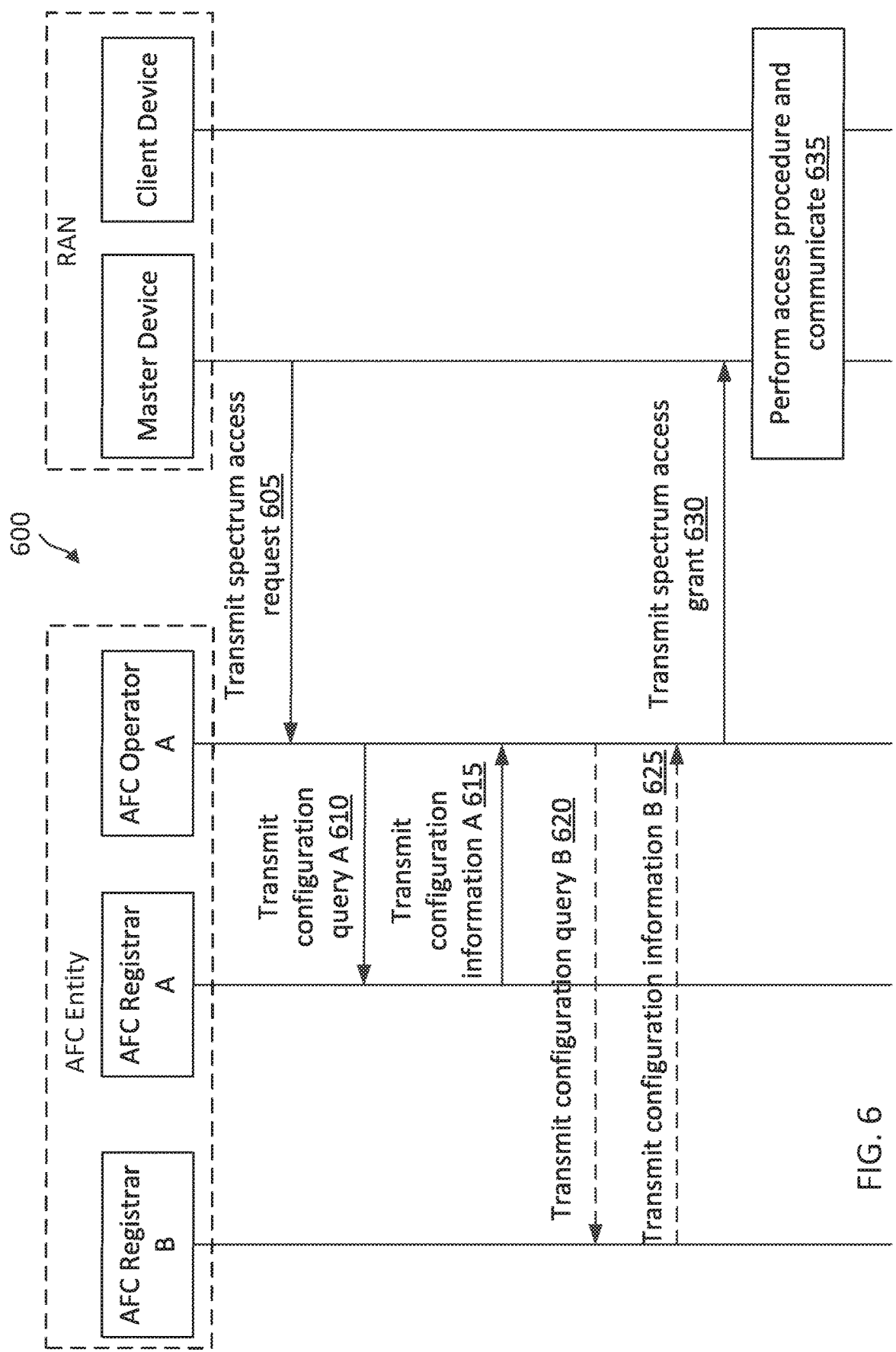
FIG. 6 is a signaling diagram of a communication method with AFC according to some embodiments of the present disclosure.

FIG. 6 is a signaling diagram of a communication method 600 with AFC according to some embodiments of the present disclosure. The method 600 is implemented by an AFC entity (e.g., the AFC entity 220 and the AFC unit 500), a master device (e.g., the BSs 105 and 400 and the AFC master devices 226), and a client device (e.g., the UEs 115 and 300). The AFC entity includes an AFC registrar A, an AFC registrar B, and an AFC operator. The AFC registrar A and the AFC registrar B may be similar to the AFC registrars 222. The AFC operator A may be similar to the AFC operators 224. The AFC registrar A and the AFC operator A may be accredited by a wireless communication standard body of technology A. The AFC registrar B may be accredited by another wireless communication standard body of technology B. In an example, the AFC registrar A, the AFC operator A, and the master device may be associated with 3GPP and the AFC registrar B may be associated with WFA. In another example, the AFC registrar A, the AFC operator A, and the master device may be associated with WFA and the AFC registrar B may be associated with 3GPP. The AFC entity is configured to coordinate sharing of a frequency spectrum. The master device may serve the client device in a RAN (e.g., the network 100) over the frequency spectrum, which may be an unlicensed spectrum or a shared spectrum, and/or other licensed spectrum. Steps of the method 600 can be executed by computing devices (e.g., a processor, processing circuit, and/or other suitable component) of the BS, the UE, and the AFC entity. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 605, the master device transmits a spectrum access request to the AFC operator A. The spectrum access request may include geographical location information associated with the master device.

At step 610, upon receiving the spectrum access request, the AFC operator A transmit a configuration query A to the AFC registrar A. The configuration query may include the geographical location information associated with the master device.

At step 615, the AFC registrar A responds to the query by transmitting configuration information A to the AFC operator A. The configuration information A includes medium access procedure or LBT parameters. For example, the configuration information A may indicate a list of available frequency bands, a signal waveform to be used for reserving a TXOP in the spectrum, a reservation detection mode, a medium contention mode, and/or a range of allowable TXOP durations (e.g., in units of number of slots).

In an embodiment, the configuration information A may indicate a certain waveform or a certain preamble sequence to be used for reserving a TXOP in the spectrum.

In an embodiment, the configuration information A may indicate that a monitoring node may determine a channel status based on energy detection. For example, when the detected energy in the channel is above a certain threshold, the channel is occupied, and thus the monitoring node may not be allowed to access the spectrum. Alternatively, when the detected energy in the channel is below the threshold, the channel is clear, and thus the monitoring node can transmit in the spectrum. In an embodiment, the configuration information A may indicate that a monitoring node may determine a channel status based on signal detection. For example, a monitoring node may monitor the channel for a reservation signal with a certain signal sequence or waveform shape. When the monitoring node detected a reservation signal of the certain signal sequence or waveform shape in the spectrum, the monitoring node may refrain from accessing the spectrum. Conversely, when the monitoring node fails to detect a reservation signal of the certain signal sequence or waveform shape in the spectrum, the monitoring node may transmit in the spectrum.

In an embodiment, the configuration information A may indicate that medium contention in the spectrum is asynchronous among different nodes and/or network operating entities. Thus, a monitoring node may start an LBT at any time and transmit in the spectrum based on an LBT pass. In an embodiment, the configuration information A may indicate that medium contention in the spectrum is synchronous among different nodes and/or network operating entities. In other words, a monitoring node is to perform LBT and transmissions according to a certain timeline. For synchronous detection or LBT mode, the configuration information A may additionally include a TXOP slot structure and/or dedicated time periods for performing LBTs.

In an embodiment, the configuration information A may indicate LBT mode that may be used for performing LBT in the spectrum. The configuration information A may indicate allowable LBT modes in each subbband within the spectrum and/or rules for determining which LBT mode (e.g., CAT1, CAT2, CAT3, or CAT4) to use. The rules may be dependent on a transmission duration and/or an amount of time elapsed since a CAT4 LBT has been performed.

In some embodiments, the configuration information A may indicate that a certain medium access procedure or protocol is to be used for a certain subband, where different medium access procedures or protocols may be allowed for different subbands within the frequency spectrum.

In some embodiments, the configuration information A may indicate that a certain RAT or standard is allowed in a certain subband. In an example, the configuration information A may indicate that 3GPP devices are allowed to access a certain subband or a range of frequencies in the spectrum, while WFA devices are allowed to access another subband or a different range of frequencies in the spectrum. In an example, the configuration information A may indicate that 3GPP devices and WFA devices are allowed to access a certain subband or a certain frequency range using a particular medium access protocol, where 3GPP and WFA may have certain pre-agreement for using the subband. Accordingly, AFC can provide certain long-term load balancing functionalities by distributing devices of various RATs across different subbands within the spectrum. In addition, AFC can ensure coexistence of different RATs in the same frequency spectrum without providing any additional coexistence functionalities.

In some embodiments, the configuration information A may indicate that a certain version of a standard (e.g., 3GPP or WiFi) is allowed to use a certain subband within the spectrum and a different version of the standard is allowed to use another subbband within the spectrum. Accordingly, AFC can control and ensure that devices sharing a subband are compatible with each other. In general, the configuration information A may include any parameter related to performing medium access or LBT in the spectrum and may be subband-specific.

At step 620, the AFC operator A may optionally transmit a configuration query B to the AFC registrar B as shown by the dashed arrow.

At step 625, the AFC registrar B may respond to the configuration query B by transmitting configuration information B. The configuration information B may include substantially similar configuration information (e.g., medium access protocol parameters, versioning parameters, and/or RAT parameters) as the configuration information A, but may be associated with a different RAT or standard body than the AFC registrar A, the master device, and the AFC operator.

At step 630, the AFC operator A transmit a spectrum access grant to the master device in response to the spectrum access request. The spectrum access grant may include access parameters. The AFC operator A may determine the access parameters for the master device based on the configuration information A and/or the configuration information B. For example, the spectrum access grant may include allowable configuration parameters including medium access protocol parameters, standard and/or protocol version parameters, and/or RAT parameters that the master device may use for accessing the spectrum based on the configuration information A and/or the configuration information B. In some examples, the AFC operator A may determine the medium access protocol parameters from the configuration information A and/or the configuration information B to optimize spectrum access for both technologies A and B. In some examples, the master device may include a geographical location of the master device in the spectrum access request. The AFC operator A may include the master device's geographical location information in the configuration query A and/or the configuration query B. The configuration A and/or the configuration B may be generated by taking into account the master device's geographical location information.

At step 635, the master device may perform medium access or LBT in the spectrum based on the medium access parameters, the versioning parameters, and/or the RAT parameters included in the spectrum access grant.

In an embodiment, the master device may monitor the spectrum for a reservation from another node using a detection mode (e.g., energy detection or signal detection) and/or a contention mode (e.g., synchronous or asynchronous) indicated by the spectrum access grant.

In an embodiment, the master device may reserve a TXOP in the spectrum by sending a reservation signal the spectrum using a preamble signal sequence or waveform indicated by the spectrum access grant. The TXOP duration may be based on TXOP parameters indicated by the spectrum access grant.

In an embodiment, the master device may select a subband for access based on a comparison of a protocol version implemented by the master device against protocol versioning parameters included in the spectrum access grant. In an example, the master device may select a subband for access based on a comparison of a RAT type implemented by the master device against RAT parameters included in the spectrum access grant. For example, the master device may be a 3GPP device implementing a certain 3GPP release version, and thus the master device may select a subband allowing access by 3GPP devices supporting the certain 3GPP release version and performs an LBT in the selected subband.

Upon a successful LBT, the master device may communicate with the client device. The master device may transmit a scheduling grant for UL and/or DL communications with the client device. The master device may communicate UL data, DL data, UL control information, and/or DL control information with the client device. In some examples, the master device may schedule multiple client devices for communications in a TXOP. For example, the TXOP may include multiple slots and the master device may communicate with each client device in one or more slots within the TXOP.

In an embodiment, the AFC registrar A and the AFC registrar B include stateless databases. The stateless databases may not track or maintain the list of frequencies and/or locations of the incumbents at each given time and/or the number of devices that are using each subband in the spectrum, but may track and maintain parameters associated with access protocols and/or procedures, standard versions, and/or RATs. In an embodiment, the AFC operator A may query other databases such as the NRA databases 210 for incumbent information.

In an embodiment, the AFC registrar A, the AFC operator A, and the master device may be associated with 3GPP and the AFC registrar B may be associated with WFA. The 3GPP AFC operator may query both the 3GPP AFC registrar and the WFA AFC registrar to determine an access configuration for granting the master device access to the spectrum.

In an embodiment, the AFC registrar A, the AFC operator A, and the master device may be associated with WFA and the AFC registrar B may be associated with 3GPP. The WFA AFC operator may query the WFA AFC registrar to determine an access configuration for granting the master device access to the spectrum. In other words, the WFA AFC operator may optimize access for WiFi devices. In some other embodiments, the WFA AFC operator may query both the WFA AFC registrar and the 3GPP AFC registrar to determine an access configuration for granting the master device access to the spectrum.

While not shown in the method 600, the method 600 can include an AFC operator B and a master device of technology B performing similar AFC spectrum sharing and communication mechanisms as the AFC operator A and the master device, respectively.

In addition, while the method 600 is described in the context of AFC operators controlling master devices in spectrum access, in some embodiments, AFC operators can also control active client device's probes. In WiFi, a client device may use two scanning methods, for example, an active scan or a passive scan for spectrum access. During an active scan, the client device transmits a probe request and listens for a probe response from an AP. During a passive scan, the client device listens on each channel for beacons sent periodically by an AP. A passive scan generally takes more time, since the client is to listen and wait for a beacon versus actively probing to find an AP. In an example, a client device (e.g., a UE 115 or 300 or an STA) may not initially access the medium autonomously. However, upon accessing the system utilizing passive scans, the client device may access an AFC database (e.g., via an AFC operator) and perform similar spectrum access functions as a master device in terms of medium access. For example, the client device may obtain a list of available frequencies and access parameters from the AFC entity, perform an active scan procedure over the available frequencies for accessing the spectrum, and/or perform medium access according to the access parameters.

In an embodiment, a wireless communication device may refer to an AFC registrar (e.g., the AFC registrars 222) for medium access configuration parameters. 3GPP, WFA, and/or other accredited industry bodies may independently define configuration parameters for corresponding industry bodies. The disclosed embodiments may allow evolution of medium access procedure within a certain technology and dynamic spectrum re-farming to support new standard releases and/or new technologies. In some embodiments, access rules and/or standard release rules may be subband dependent. Further, the disclosed embodiments may facilitate and improve coexistence among technologies.

Figure 7:
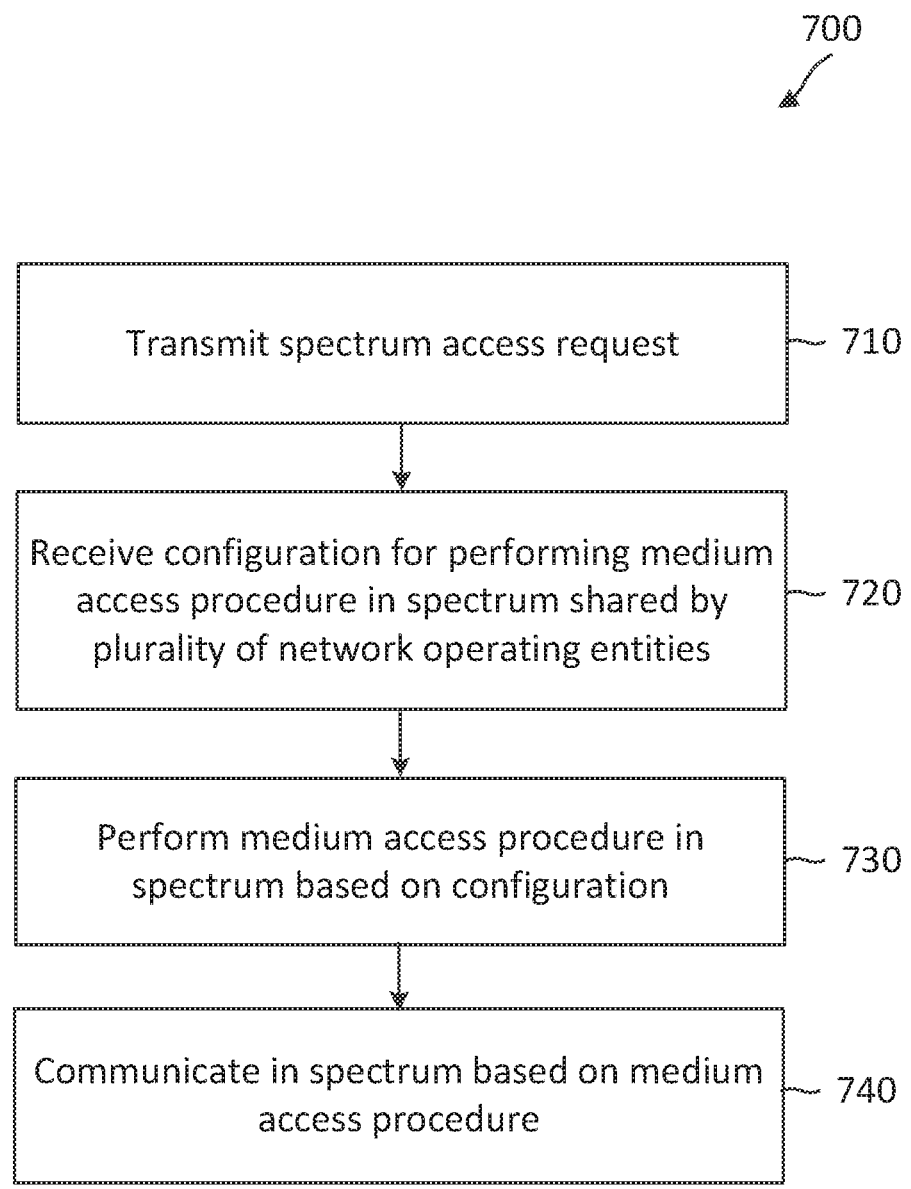
FIG. 7 is a flow diagram of a communication method with AFC according to some embodiments of the present disclosure.

FIG. 7 is a flow diagram of a communication method 700 with AFC according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the BS 105, the BS 400, or the master device 226, may utilize one or more components, such as the processor 402, the memory 404, the AFC module 408, the communication module 409, the transceiver 410, the modem 412, and the one or more antennas 416, to execute the steps of method 700. In another example, a wireless communication device, such as the UE 115 or UE 300, may utilize one or more components, such as the processor 302, the memory 304, the AFC module 308, the communication module 309, the transceiver 310, the modem 312, and the one or more antennas 316, to execute the steps of method 700. The method 700 may employ similar mechanisms as in the method 600 as described above with respect to FIG. 6. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes transmitting, by a first wireless communication device (e.g., the BS 105, the BS 400, the master device 226, the UE 115, or the UE 300) to a spectrum access coordination entity (e.g., the AFC entity 220, the AFC unit 500), a spectrum access request.

At step 720, the method 700 includes receiving, by the first wireless communication device from the spectrum access coordination entity in response to the spectrum access request, a configuration including at least a medium access protocol parameter for performing a medium access procedure (e.g., an LBT) in a spectrum shared by a plurality of network operating entities.

At step 730, the first wireless communication device performs the medium access procedure in the spectrum based at least in part on the medium access protocol parameter to reserve a TXOP in the spectrum.

At step 740, the first wireless communication device communicates, with a second wireless communication device, a communication signal (e.g., a PDSCH signal, a PUSCH signal, a PDCCH signal, and/or a PUCCH signal) in the spectrum during the TXOP.

In an embodiment, the first wireless communication device is a BS or a master device and the second wireless communication device is a UE or a client device. In an embodiment, the first wireless communication device is a UE or a client device and the second wireless communication device is a BS or a master device.

In an embodiment, the medium access protocol parameter is associated with at least one of a signal waveform for reserving the TXOP, a reservation detection mode for monitoring a channel status of the spectrum, a medium contention mode for contending for the TXOP in the spectrum, or a duration of the TXOP. In an embodiment, the medium access protocol parameter may indicate, but not limited to, synchronous vs asynchronous access, maximum channel occupancy time, and/or a contention window size. In an embodiment, the configuration includes one or more parameters associated with medium access in different subbands within the spectrum and the one or more parameters include the medium access protocol parameter.

In an embodiment, the configuration further includes communication protocol information indicating that a first communication protocol (e.g., physical layer, medium access control (MAC) layer, and/or network layer versioning information) is allowed in at least a first subband within the spectrum. In an embodiment, the communicating includes communicating, by the first wireless communication device with the second wireless communication device, the communication signal in at least the first subband using the first communication protocol based on the communication protocol information.

It should be noted that a communication protocol may refer to a certain communication specification standardized by a standard body, such as 3GPP or IEEE. A medium access protocol refers to a certain medium access procedure (e.g., configured with certain medium access parameters). In some instances, different versions of a communication protocol or specification may have different transmission procedures, but may have the same medium access parameters. In some instances, the different transmission procedures from the different communication protocol versions may have impact on coexistence among devices of the different versions or coexistence with devices of another RAT.

In an embodiment, the configuration further includes RAT information indicating that a first RAT is allowed in at least a first subband within the spectrum. In an embodiment, the communicating includes communicating, by the first wireless communication device with the second wireless communication device, the communication signal in at least the first subband using the first RAT based on the RAT information. In an embodiment, the RAT information includes at least one of a WiFi technology or a 3GPP technology.

Figure 8:
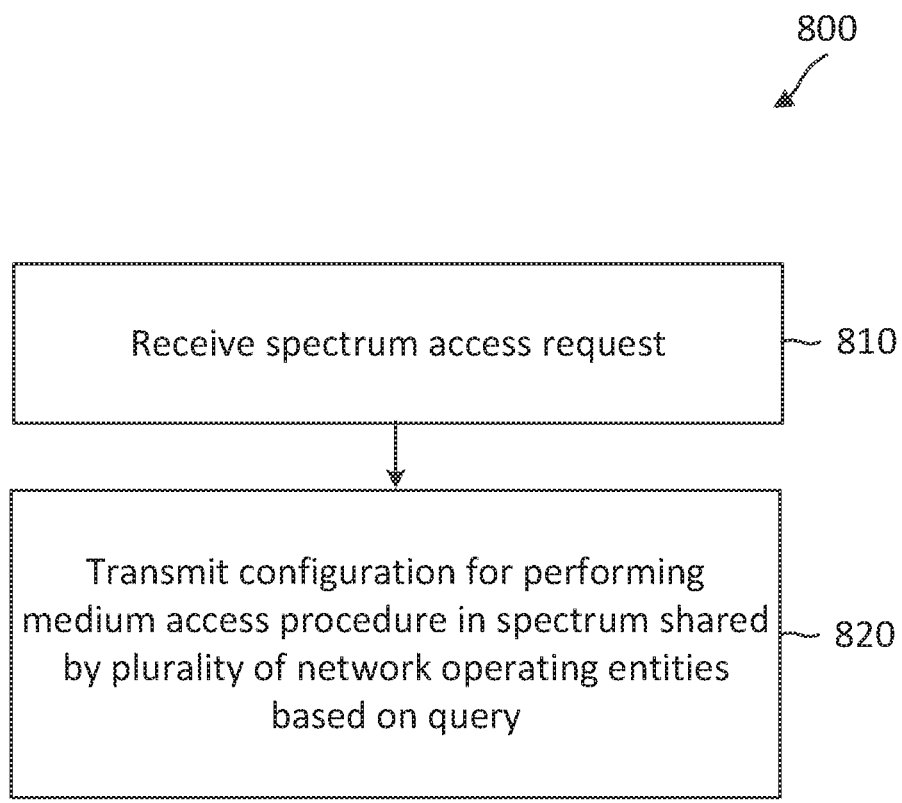
FIG. 8 is a flow diagram of a communication method with AFC according to some embodiments of the present disclosure.

FIG. 8 is a flow diagram of a communication method 800 with AFC according to some embodiments of the present disclosure. Steps of the method 800 can be executed by a computing device (e.g., a processor, processing circuit, and/or other suitable component) of a wireless communication device or other suitable means for performing the steps. For example, a wireless communication device, such as the AFC entity 220 or the AFC unit 500, may utilize one or more components, such as the processor 502, the memory 504, the AFC module 508, the communication module 509, the transceiver 510, the modem 512, and the one or more antennas 516, to execute the steps of method 800. The method 800 may employ similar mechanisms as in the method 600 as described above with respect to FIG. 6. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes receiving, by a spectrum access coordination entity from a wireless communication device, a spectrum access request.

At step 820, the method 800 includes transmitting, by the spectrum access coordination entity to the wireless communication device in response to the spectrum access request, a configuration including at least a medium access protocol parameter for performing a medium access procedure in a spectrum shared by a plurality of network operating entities.

In an embodiment, the wireless communication device is a BS (e.g., the BSs 105 and 400) or a master device (e.g., the AFC master device 226). In another embodiment, the wireless communication device is a UE or a client device (e.g., UEs 115 and 300).

In an embodiment, the medium access protocol parameter is associated with at least one of a signal waveform for reserving a TXOP in the spectrum, a reservation detection mode (e.g., energy detection or signal detection) for monitoring a channel status of the spectrum, a medium contention mode (e.g., asynchronous or synchronous) for contending for a TXOP in the spectrum, or a TXOP duration (e.g., 2, 3, 4, 5 or more slots). In an embodiment, the medium access protocol parameter may indicate, but not limited to, synchronous vs asynchronous access, maximum channel occupancy time, and/or a contention window size.

In an embodiment, the configuration includes one or more parameters associated with medium access in different subbands within the spectrum and the one or more parameters include the medium access protocol parameter. In an embodiment, the configuration further includes communication protocol information indicating that a first communication protocol is allowed in at least a first subband within the spectrum. In an embodiment, the configuration further indicates radio access technology (RAT) information indicating that a first RAT is allowed in at least a first subband within the spectrum. In an embodiment, the RAT information includes at least one of a WiFi technology or a 3GPP technology.

In an embodiment, the spectrum access coordination entity performs a first configuration query. The spectrum access coordination entity obtains first medium access information, where the transmitting the configuration is further based on the first medium access information. In an embodiment, the spectrum access coordination entity performs a second configuration query and obtains second medium access information. The first medium access information and the second medium access information are associated with different RATs (e.g., WiFi and 3GPP). The transmitting the configuration is further based on the second medium access information.

In an embodiment, the spectrum access coordination entity stores, in a database (e.g., in the memory 504), one or more parameters associated with at least one of the medium access procedure, an allowable communication protocol in the spectrum, or an allowable radio access technology in the spectrum. The database may be similar to the AFC registrars 222. In an embodiment, the spectrum access coordination entity generates the configuration based on the one or more parameters.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including transmitting, by a first wireless communication device to a spectrum access coordination entity, a spectrum access request; and receiving, by the first wireless communication device from the spectrum access coordination entity in response to the spectrum access request, a configuration including at least a medium access protocol parameter for performing a medium access procedure in a spectrum shared by a plurality of network operating entities. In some aspects, the method may also include performing, by the first wireless communication device, the medium access procedure based at least in part on the medium access protocol parameter to reserve a transmission opportunity (TXOP) in the spectrum; and communicating, by the first wireless communication device with a second wireless communication device, a communication signal in the spectrum during the TXOP. The method may also include where the first wireless communication device is a base station (BS), and where the second wireless communication device is a user equipment (UE). The method may also include where the first wireless communication device is a user equipment (UE), and where the second wireless communication device is base station (BS). The method may also include where the medium access protocol parameter is associated with at least one of a signal waveform for reserving the TXOP, a reservation detection mode for monitoring a channel status of the spectrum, a medium contention mode for contending for the TXOP in the spectrum, or a duration of the TXOP. The method may also include where the configuration includes one or more parameters associated with medium access in different subbands within the spectrum, and where the one or more parameters include the medium access protocol parameter. The method may also include where the configuration further includes communication protocol information indicating that a first communication protocol is allowed in at least a first subband within the spectrum. The method may also include where the communicating includes communicating, by the first wireless communication device with the second wireless communication device, the communication signal in at least the first subband using the first communication protocol based on the communication protocol information. The method may also include where the configuration further includes radio access technology (RAT) information indicating that a first RAT is allowed in at least a first subband within the spectrum. The method may also include where the communicating includes communicating, by the first wireless communication device with the second wireless communication device, the communication signal in at least the first subband using the first RAT based on the RAT information. The method may also include where the RAT information includes at least one of an Institute of Electrical and Electronic Engineers (IEEE) 802.11 (WiFi) technology or a 3rd Generation Partnership Project (3GPP) technology.

Further embodiments of the present disclosure include a method of wireless communication, including receiving, by a spectrum access coordination entity from a wireless communication device, a spectrum access request; and transmitting, by the spectrum access coordination entity to the wireless communication device in response to the spectrum access request, a configuration including at least a medium access protocol parameter for performing a medium access procedure in a spectrum shared by a plurality of network operating entities. In some aspects, the method may also include where the wireless communication device is a base station (BS). The method may also include where the wireless communication device is a user equipment (UE). The method may also include where the medium access protocol parameter is associated with at least one of a signal waveform for reserving a transmission opportunity (TXOP) in the spectrum, a reservation detection mode for monitoring a channel status of the spectrum, a medium contention mode for contending for a TXOP in the spectrum, or a TXOP duration. The method may also include where the configuration includes one or more parameters associated with medium access in different subbands within the spectrum, and where the one or more parameters include the medium access protocol parameter. The method may also include where the configuration further includes communication protocol information indicating that a first communication protocol is allowed in at least a first subband within the spectrum. The method may also include where the configuration further includes radio access technology (RAT) information indicating that a first RAT is allowed in at least a first subband within the spectrum. The method may also include where the RAT information includes at least one of an Institute of Electrical and Electronic Engineers (IEEE) 802.11 (WiFi) technology or a 3rd Generation Partnership Project (3GPP) technology. The method may also include performing, by the spectrum access coordination entity, a first configuration query; and obtaining, by the spectrum access coordination entity, first medium access information, where the transmitting the configuration is further based on the first medium access information. The method may also include performing, by the spectrum access coordination entity, a second configuration query; and obtaining, by the spectrum access coordination entity, second medium access information, the first medium access information and the second medium access information are associated with different radio access technologies, where the transmitting the configuration is further based on the second medium access information. The method may also include storing, by the spectrum access coordination entity in a database, one or more parameters associated with at least one of the medium access procedure, an allowable communication protocol in the spectrum, or an allowable radio access technology in the spectrum. The method may also include generating, by the spectrum access coordination entity, the configuration based on the one or more parameters.

Further embodiments of the present disclosure include an apparatus including a transceiver configured to transmit, to a spectrum access coordination entity, a spectrum access request; and receive, from the spectrum access coordination entity in response to the spectrum access request, a configuration including at least a medium access protocol parameter for performing a medium access procedure in a spectrum shared by a plurality of network operating entities.

In some aspects, the apparatus may also include a processor configured to perform the medium access procedure based at least in part on the medium access protocol parameter to reserve a transmission opportunity (TXOP) in the spectrum, where the transceiver is further configured to communicate, with a wireless communication device, a communication signal in the spectrum during the TXOP. The apparatus may also include where the apparatus is a base station (BS), and where the wireless communication device is a user equipment (UE). The apparatus may also include where the apparatus is a user equipment (UE), and where the wireless communication device is base station (BS). The apparatus may also include where the medium access protocol parameter is associated with at least one of a signal waveform for reserving the TXOP, a reservation detection mode for monitoring a channel status of the spectrum, a medium contention mode for contending for the TXOP in the spectrum, or a duration of the TXOP. The apparatus may also include where the configuration includes one or more parameters associated with medium access in different subbands within the spectrum, and where the one or more parameters include the medium access protocol parameter. The apparatus may also include where the configuration further includes communication protocol information indicating that a first communication protocol is allowed in at least a first subband within the spectrum. The apparatus may also include where the transceiver is further configured to communicate the communication signal by communicate, with the wireless communication device, the communication signal in at least the first subband using the first communication protocol based on the communication protocol information. The apparatus may also include where the configuration further includes radio access technology (RAT) information indicating that a first RAT is allowed in at least a first subband within the spectrum. The apparatus may also include where the transceiver is further configured to communicate the communication signal by communicate, with the wireless communication device, the communication signal in at least the first subband using the first RAT based on the RAT information. The apparatus may also include where the RAT information includes at least one of an Institute of Electrical and Electronic Engineers (IEEE) 802.11 (WiFi) technology or a 3rd Generation Partnership Project (3GPP) technology.

Further embodiments of the present disclosure include an apparatus including a transceiver configured to receive, from a wireless communication device, a spectrum access request; and transmit, to the wireless communication device in response to the spectrum access request, a configuration including at least a medium access protocol parameter for performing a medium access procedure in a spectrum shared by a plurality of network operating entities.

In some aspects, the apparatus may also include where the wireless communication device is a base station (BS). The apparatus may also include where the wireless communication device is a user equipment (UE). The apparatus may also include where the medium access protocol parameter is associated with at least one of a signal waveform for reserving a transmission opportunity (TXOP) in the spectrum, a reservation detection mode for monitoring a channel status of the spectrum, a medium contention mode for contending for a TXOP in the spectrum, or a TXOP duration.

The apparatus may also include where the configuration includes one or more parameters associated with medium access in different subbands within the spectrum, and where the one or more parameters include the medium access protocol parameter. The apparatus may also include where the configuration further includes communication protocol information indicating that a first communication protocol is allowed in at least a first subband within the spectrum. The apparatus may also include where the configuration further includes radio access technology (RAT) information indicating that a first RAT is allowed in at least a first subband within the spectrum. The apparatus may also include where the RAT information includes at least one of an Institute of Electrical and Electronic Engineers (IEEE) 802.11 (WiFi) technology or a 3rd Generation Partnership Project (3GPP) technology. The apparatus may also include a processor configured to perform a first configuration query; and obtain first medium access information, where the transceiver is further configured to transmit the configuration further based on the first medium access information. The apparatus may also include where the processor is further configured to perform a second configuration query; and obtain second medium access information, the first medium access information and the second medium access information are associated with different radio access technologies, and where the transceiver is further configured to transmit the configuration further based on the second medium access information. The apparatus may also include a processor configured to store, in a database, one or more parameters associated with at least one of the medium access procedure, an allowable communication protocol in the spectrum, or an allowable radio access technology in the spectrum. The apparatus may also include where the processor is further configured to generate the configuration based on the one or more parameters.

Further embodiments of the present disclosure include a computer-readable medium having program code recorded thereon, the program code including code for causing a first wireless communication device to transmit, to a spectrum access coordination entity, a spectrum access request; and code for causing the first wireless communication device to receive, from the spectrum access coordination entity in response to the spectrum access request, a configuration including at least a medium access protocol parameter for performing a medium access procedure in a spectrum shared by a plurality of network operating entities.

In some aspects, the computer-readable medium may also include code for causing the first wireless communication device to perform the medium access procedure based at least in part on the medium access protocol parameter to reserve a transmission opportunity (TXOP) in the spectrum; and code for causing the first wireless communication device to communicate, with a second wireless communication device, a communication signal in the spectrum during the TXOP. The computer-readable medium may also include where the first wireless communication device is a base station (BS), and where the second wireless communication device is a user equipment (UE). The computer-readable medium may also include where the first wireless communication device is a user equipment (UE), and where the second wireless communication device is base station (BS). 51. The computer-readable medium may also include where the medium access protocol parameter is associated with at least one of a signal waveform for reserving the TXOP, a reservation detection mode for monitoring a channel status of the spectrum, a medium contention mode for contending for the TXOP in the spectrum, or a duration of the TXOP. The computer-readable medium may also include where the configuration includes one or more parameters associated with medium access in different subbands within the spectrum, and where the one or more parameters include the medium access protocol parameter. The computer-readable medium may also include where the configuration further includes communication protocol information indicating that a first communication protocol is allowed in at least a first subband within the spectrum. The computer-readable medium may also include where the code for causing the first wireless communication device to communicate the communication signal is further configured to communicate, with the second wireless communication device, the communication signal in at least the first subband using the first communication protocol based on the communication protocol information. The computer-readable medium may also include where the configuration further includes radio access technology (RAT) information indicating that a first RAT is allowed in at least a first subband within the spectrum. The computer-readable medium may also include where the code for causing the first wireless communication device to communicate the communication signal is further configured to communicate, with the second wireless communication device, the communication signal in at least the first subband using the first RAT based on the RAT information. The computer-readable medium may also include where the RAT information includes at least one of an Institute of Electrical and Electronic Engineers (IEEE) 802.11 (WiFi) technology or a 3rd Generation Partnership Project (3GPP) technology.

Further embodiments of the present disclosure include a computer-readable medium having program code recorded thereon, the program code including code for causing a spectrum access coordination entity to receive, from a wireless communication device, a spectrum access request; and code for causing the spectrum access coordination entity to transmit, to the wireless communication device in response to the spectrum access request, a configuration including at least a medium access protocol parameter for performing a medium access procedure in a spectrum shared by a plurality of network operating entities.

In some aspects, the computer-readable medium may also include where the wireless communication device is a base station (BS). The computer-readable medium may also include where the wireless communication device is a user equipment (UE). The computer-readable medium may also include where the medium access protocol parameter is associated with at least one of a signal waveform for reserving a transmission opportunity (TXOP) in the spectrum, a reservation detection mode for monitoring a channel status of the spectrum, a medium contention mode for contending for a TXOP in the spectrum, or a TXOP duration. The computer-readable medium may also include where the configuration includes one or more parameters associated with medium access in different subbands within the spectrum, and where the one or more parameters include the medium access protocol parameter. The computer-readable medium may also include where the configuration further includes communication protocol information indicating that a first communication protocol is allowed in at least a first subband within the spectrum. The computer-readable medium may also include where the configuration further includes radio access technology (RAT) information indicating that a first RAT is allowed in at least a first subband within the spectrum. The computer-readable medium may also include where the RAT information includes at least one of an Institute of Electrical and Electronic Engineers (IEEE) 802.11 (WiFi) technology or a 3rd Generation Partnership Project (3GPP) technology. The computer-readable medium may also include code for causing the spectrum access coordination entity to perform a first configuration query; and code for causing the spectrum access coordination entity to obtain first medium access information, where the code for causing the spectrum access coordination entity to transmit the configuration is further configured to transmit the configuration based on the first medium access information. The computer-readable medium may also include code for causing the spectrum access coordination entity to perform a second configuration query; and code for causing the spectrum access coordination entity to obtain second medium access information, the first medium access information and the second medium access information are associated with different radio access technologies, where the code for causing the spectrum access coordination entity to transmit the configuration is further configured to transmit the configuration based on the second medium access information. The computer-readable medium may also include code for causing the spectrum access coordination entity to store, in a database, one or more parameters associated with at least one of the medium access procedure, an allowable communication protocol in the spectrum, or an allowable radio access technology in the spectrum. The computer-readable medium may also include code for causing the spectrum access coordination entity to generate the configuration based on the one or more parameters.

Further embodiments of the present disclosure include an apparatus including means for transmitting, to a spectrum access coordination entity, a spectrum access request; and means for receiving, from the spectrum access coordination entity in response to the spectrum access request, a configuration including at least a medium access protocol parameter for performing a medium access procedure in a spectrum shared by a plurality of network operating entities.

In some aspects, the apparatus may also include means for performing the medium access procedure based at least in part on the medium access protocol parameter to reserve a transmission opportunity (TXOP) in the spectrum; and means for communicating, with a wireless communication device, a communication signal in the spectrum during the TXOP. The apparatus may also include where the apparatus is a base station (BS), and where the wireless communication device is a user equipment (UE). The apparatus may also include where the apparatus is a user equipment (UE), and where the wireless communication device is base station (BS). The apparatus may also include where the medium access protocol parameter is associated with at least one of a signal waveform for reserving the TXOP, a reservation detection mode for monitoring a channel status of the spectrum, a medium contention mode for contending for the TXOP in the spectrum, or a duration of the TXOP. The apparatus may also include where the configuration includes one or more parameters associated with medium access in different subbands within the spectrum, and where the one or more parameters include the medium access protocol parameter. The apparatus may also include where the configuration further includes communication protocol information indicating that a first communication protocol is allowed in at least a first subband within the spectrum. The apparatus may also include where the configuration further includes radio access technology (RAT) information indicating that a first RAT is allowed in at least a first subband within the spectrum.

Further embodiments of the present disclosure include an apparatus including means for receiving, from a wireless communication device, a spectrum access request; and means for transmitting, to the wireless communication device in response to the spectrum access request, a configuration including at least a medium access protocol parameter for performing a medium access procedure in a spectrum shared by a plurality of network operating entities.

In some aspects, the apparatus may also include where the wireless communication device is a base station (BS). The wireless communication device is a user equipment (UE). The apparatus may also include where the medium access protocol parameter is associated with at least one of a signal waveform for reserving a transmission opportunity (TXOP) in the spectrum, a reservation detection mode for monitoring a channel status of the spectrum, a medium contention mode for contending for a TXOP in the spectrum, or a TXOP duration. The apparatus may also include where the configuration includes one or more parameters associated with medium access in different subbands within the spectrum, and where the one or more parameters include the medium access protocol parameter. The apparatus may also include where the configuration further includes communication protocol information indicating that a first communication protocol is allowed in at least a first subband within the spectrum. The apparatus may also include where the configuration further includes radio access technology (rat) information indicating that a first rat is allowed in at least a first subband within the spectrum. The apparatus may also include where the rat information includes at least one of an institute of electrical and electronic engineers (IEEE) 802.11 (WiFi) technology or a 3rd generation partnership project (3GPP) technology. The apparatus may also include where the means for transmitting the configuration is further configured to transmit the configuration based on the first medium access information. The apparatus may also include where the means for transmitting the configuration is further configured to transmit the configuration based on the second medium access information. The apparatus may also include means for storing, in a database, one or more parameters associated with at least one of the medium access procedure, an allowable communication protocol in the spectrum, or an allowable radio access technology in the spectrum. The apparatus may also include means for generating the configuration based on the one or more parameters.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a first wireless communication device to a spectrum access coordination entity, a spectrum access request, wherein the spectrum access request requests access for the first wireless communication device to a spectrum shared by a plurality of network operating entities; and
   receiving, by the first wireless communication device from the spectrum access coordination entity in response to the spectrum access request, a configuration including at least a medium access protocol parameter for performing a medium access procedure in the spectrum shared by the plurality of network operating entities, wherein the medium access protocol parameter is associated with a communication protocol version allowed in at least a first subband within the spectrum.

2. The method of claim 1, further comprising:
   performing, by the first wireless communication device, the medium access procedure based at least in part on the medium access protocol parameter to reserve a transmission opportunity (TXOP) in the spectrum; and
   communicating, by the first wireless communication device with a second wireless communication device, a communication signal in the spectrum during the TXOP.

3. The method of claim 2, wherein the first wireless communication device is one of a base station (BS) or a user equipment (UE), and wherein the second wireless communication device is a different one of the BS or the UE.

4. The method of claim 2, wherein the medium access protocol parameter is associated with at least one of a signal waveform for reserving the TXOP, a reservation detection mode for monitoring a channel status of the spectrum, a medium contention mode for contending for the TXOP in the spectrum, or a duration of the TXOP.

5. The method of claim 4, wherein the configuration includes one or more parameters associated with medium access in different subbands within the spectrum, and wherein the one or more parameters include the medium access protocol parameter.

6. The method of claim 2, wherein the configuration further includes communication protocol information indicating that a first communication protocol having the communication protocol version is allowed in at least the first subband within the spectrum.

7. The method of claim 6, wherein the communicating includes:
   communicating, by the first wireless communication device with the second wireless communication device, the communication signal in at least the first subband using the first communication protocol based on the communication protocol information.

8. The method of claim 2, wherein the configuration further includes radio access technology (RAT) information indicating that a first RAT is allowed in at least a first subband within the spectrum.

9. The method of claim 8, wherein the communicating includes:
   communicating, by the first wireless communication device with the second wireless communication device, the communication signal in at least the first subband using the first RAT based on the RAT information.

10. The method of claim 8, wherein the RAT information includes at least one of an Institute of Electrical and Electronic Engineers (IEEE) 802.11 (WiFi) technology or a 3rd Generation Partnership Project (3GPP) technology.

11. A method of wireless communication, comprising:
    receiving, by a spectrum access coordination entity from a wireless communication device, a spectrum access request, wherein the spectrum access request requests access for the wireless communication device to a spectrum shared by a plurality of network operating entities; and
    transmitting, by the spectrum access coordination entity to the wireless communication device in response to the spectrum access request, a configuration including at least a medium access protocol parameter for performing a medium access procedure in the spectrum shared by the plurality of network operating entities, wherein the medium access protocol parameter is associated with a communication protocol version allowed in at least a first subband within the spectrum.

12. The method of claim 11, wherein the wireless communication device is one of a base station (BS) or a user equipment (UE).

13. The method of claim 11, wherein the medium access protocol parameter is associated with at least one of a signal waveform for reserving a transmission opportunity (TXOP) in the spectrum, a reservation detection mode for monitoring a channel status of the spectrum, a medium contention mode for contending for the TXOP in the spectrum, or a TXOP duration.

14. The method of claim 13, wherein the configuration includes one or more parameters associated with medium access in different subbands within the spectrum, and wherein the one or more parameters include the medium access protocol parameter.

15. The method of claim 11, wherein the configuration further includes communication protocol information indicating that a first communication protocol having the communication protocol version is allowed in at least the first subband within the spectrum.

16. The method of claim 11, wherein the configuration further includes radio access technology (RAT) information indicating that a first RAT is allowed in at least a first subband within the spectrum.

17. The method of claim 16, wherein the RAT information includes at least one of an Institute of Electrical and Electronic Engineers (IEEE) 802.11 (WiFi) technology or a 3rd Generation Partnership Project (3GPP) technology.

18. The method of claim 11, further comprising:
performing, by the spectrum access coordination entity, a first configuration query; and
obtaining, by the spectrum access coordination entity, first medium access information,
wherein the transmitting the configuration is further based on the first medium access information.

19. The method of claim 18, further comprising:
performing, by the spectrum access coordination entity, a second configuration query; and
obtaining, by the spectrum access coordination entity, second medium access information, the first medium access information and the second medium access information are associated with different radio access technologies,
wherein the transmitting the configuration is further based on the second medium access information.

20. The method of claim 11, further comprising:
storing, by the spectrum access coordination entity in a database, one or more parameters associated with at least one of the medium access procedure, an allowable communication protocol in the spectrum, or an allowable radio access technology in the spectrum.

21. The method of claim 20, further comprising:
generating, by the spectrum access coordination entity, the configuration based on the one or more parameters.

22. An apparatus comprising:
a transceiver configured to:
transmit, to a spectrum access coordination entity, a spectrum access request wherein the spectrum access request requests access for the apparatus to a spectrum shared by a plurality of network operating entities; and
receive, from the spectrum access coordination entity in response to the spectrum access request, a configuration including at least a medium access protocol parameter for performing a medium access procedure in the spectrum shared by the plurality of network operating entities, wherein the medium access protocol parameter is associated with a communication protocol version allowed in at least a first subband within the spectrum.

23. The apparatus of claim 22, further comprising:
a processor configured to perform the medium access procedure based at least in part on the medium access protocol parameter to reserve a transmission opportunity (TXOP) in the spectrum,
wherein the transceiver is further configured to communicate, with a wireless communication device, a communication signal in the spectrum during the TXOP.

24. The apparatus of claim 23, wherein the apparatus is one of a base station (BS) or a user equipment (UE), and wherein the wireless communication device is a different one of the BS or the UE.

25. The apparatus of claim 23, wherein the configuration further includes at least one of:
one or more parameters associated with medium access in different subbands within the spectrum, the one or more parameters including the medium access protocol parameter associated with at least one of a signal waveform for reserving the TXOP, a reservation detection mode for monitoring a channel status of the spectrum, a medium contention mode for contending for the TXOP in the spectrum, or a duration of the TXOP;
communication protocol information indicating that a first communication protocol having the communication protocol version is allowed in at least the first subband within the spectrum; or
radio access technology (RAT) information indicating that a first RAT is allowed in at least the first subband.

26. An apparatus comprising:
a transceiver configured to:
receive, from a wireless communication device, a spectrum access request, wherein the spectrum access request requests access for the wireless communication device to a spectrum shared by a plurality of network operating entities; and
transmit, to the wireless communication device in response to the spectrum access request, a configuration including at least a medium access protocol parameter for performing a medium access procedure in the spectrum shared by the plurality of network operating entities, wherein the medium access protocol parameter is associated with a communication protocol version allowed in at least a first subband within the spectrum.

27. The apparatus of claim 26, wherein the wireless communication device is one of a base station (BS) or a user equipment (UE).

28. The apparatus of claim 26, wherein the configuration further includes at least one of:
one or more parameters associated with medium access in different subbands within the spectrum, the one or more parameters including the medium access protocol parameter associated with at least one of a signal waveform for reserving a transmission opportunity (TXOP) in the spectrum, a reservation detection mode for monitoring a channel status of the spectrum, a medium contention mode for contending for the TXOP in the spectrum, or a TXOP duration;

communication protocol information indicating that a first communication protocol is allowed in at least a first subband within the spectrum; or radio access technology (RAT) information indicating that a first RAT is allowed in at least the first subband.

29. The apparatus of claim 26, further comprising:
a processor configured to:
- perform at least one of a first configuration query or a second configuration query; and
- obtain at least one of:
  - first medium access information based on the first configuration query; or
  - second medium access information based on the second configuration query, the second medium access information being different from the first medium access information,
wherein the transceiver configured to transmit the configuration is configured to transmit the configuration further based on at least one of the first medium access information or the second medium access information.

30. The apparatus of claim 26, further comprising:
a processor configured to:
- store, in a database, one or more parameters associated with at least one of the medium access procedure, the communication protocol version allowed in at least the first subband within the spectrum, or an allowable radio access technology in the spectrum; and
- generate the configuration based on the one or more parameters.

* * * * *